（12） United States Patent
Jain et al.

(10) Patent No.: US 8,457,289 B2
(45) Date of Patent: Jun. 4, 2013

(54) SYSTEM AND METHOD FOR COLLABORATIVE CONTENT CREATION ON THE TELECOM WEB

(75) Inventors: Anupam Jain, New Delhi (IN); Amit A. Nanavati, New Delhi (IN); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 13/110,622

(22) Filed: May 18, 2011

(65) Prior Publication Data

US 2012/0294432 A1    Nov. 22, 2012

(51) Int. Cl.
*H04M 11/00*    (2006.01)
(52) U.S. Cl.
USPC ................................ 379/93.21; 379/88.21
(58) Field of Classification Search
USPC ................. 379/88.22, 93.21, 75, 76, 88.23, 379/88.26, 88.27
See application file for complete search history.

(56) References Cited

U.S. PATENT DOCUMENTS

| 5,945,989 | A  | 8/1999  | Freishtat et al. |
|-----------|----|---------|------------------|
| 6,895,084 | B1 | 5/2005  | Saylor et al. |
| 2003/0055651 | A1 | 3/2003 | Pfeiffer et al. |
| 2008/0144783 | A1 | 6/2008 | Kumar et al. |
| 2008/0319760 | A1 | 12/2008 | Da Palma et al. |
| 2009/0232287 | A1 | 9/2009 | Agarwal et al. |
| 2009/0238348 | A1 | 9/2009 | Agarwal et al. |
| 2009/0254347 | A1 | 10/2009 | Moore et al. |

OTHER PUBLICATIONS

Kumar, Arun, et al., "VOIGEN: A Technology for Enabling Data Services in Developing Regions", IBM Research—Technical Paper Search, 2007.
Kumar, Arun, et al., "VOISERV: Creation and Delivery of Converged Services through Voice for Emerging Economies," IEEE International Symposium on a World of Wireless, Mobile and Multimedia Networks, Jun. 18-21, 2007, pp. 1-8.
Kumar, Arun, et al., "The Spoken Web Application Framework—User Generated Content and Service Creation through low-end mobiles," W4A2010—Technical, Apr. 26-27, 2010, Raleigh, NC, USA.

*Primary Examiner* — Creighton Smith
(74) *Attorney, Agent, or Firm* — Cahn & Samuels, LLP

(57) ABSTRACT

A system and method that enables the collaborative creation and editing of content on a VoiceSite over a telephone. The system and method enables the collaborative creation and editing of content on the VoiceSite by allowing one or multiple users (authors) to generate and edit the content of the VoiceSite at the same or different times. A Collaboration Manager is utilized to manage calls to/from one or more users. A VoiGen component utilizes voice-activated prompts to allow the one or more users to perform at least one of specify user preferences, load templates, store user preferences and service options, parse through obtained data, and generate/edit the VoiceSite based on the inputs provided by the one or multiple users. A Session Manager stores user specific information and ensures that the content provided by multiple users, including edits/changes, is integrated without conflicts.

16 Claims, 3 Drawing Sheets

SYSTEM AND METHOD FOR COLLABORATIVE CONTENT CREATION ON THE TELECOM WEB

I. FIELD OF THE INVENTION

The present invention relates to a system and method that enables collaborative creation and editing of voice sites by multiple users via telephone.

II. BACKGROUND OF THE INVENTION

The Internet is a global system of interconnected computer networks that allows users to access information and resources via interlinked hypertext documents on the World Wide Web (WWW) (commonly referred to as "the Web"). Users can browse these documents utilizing a web browser that navigates between the various websites or webpages. The Internet provides users with a wealth of information, data, and communication services including commercial websites/ webpages, personal websites/webpages, electronic commerce (e-commerce), news services, financial services, and electronic mail (e-mail), short message service (SMS), etc. The Internet also been used to provide other telecommunication services such as voice over Internet Protocol (VoIP). Many websites also provide a voice interface by playing audio files and accepting audio inputs.

Service providers have offered basic data services in the typical telecommunication based networks such as email, news updates, etc. However, a disadvantage of these services is that they typically require a digital device such as a computer or smart phone that interfaces with the Internet infrastructure in order to access the information. A further disadvantage of these systems is that they do not provide an infrastructure that provides voice and digital information such that a telephone user could provide and control data services to other telephone users.

The World Wide Telecom Web (WWTW) (also referred to as "Telecom Web" or "Spoken Web") is a voice-driven communications system that is parallel and complimentary to the WWW. The WWTW is a network of interconnected VoiceSites (which are analogous to web sites). Each VoiceSite consists of a set of interconnected VoicePages (i.e., VXML files) that are hosted and collocated in the telecom infrastructure. VoiceSites are voice-driven, user created and hosted applications that are accessible via mobile or landline telephones. Users access the VoiceSite to listen to the content that has been uploaded there or to upload additional content.

The present invention provides a VoiceSite having many useful advantages including, for example, the ability to: (i) allow multiple users, i.e., authors or roles, to create and/or edit a VoiceSite at the same or different times by calling into and editing the VoiceSite; (ii) synchronize and merge the input of each user; (iv) display different voice interfaces to different users based on their roles, section(s) edited, edit history, etc.; (v) pass control to different users at different points in time; (vi) perform consistency checks when the same content is being edited; (vii) automatically recognize which input from which user goes to which VoiceSite or VoiceSite section; and (viii) make outbound calls to users to gather input.

III. SUMMARY OF THE INVENTION

In at least one embodiment, this invention provides a method for collaborative content creation including allowing multiple users to access a voicesite at the same or different times; allowing multiple users to create and edit sections of a voicesite at the same or different times, wherein the users access the voicesite using one or more telephones; determining whether any of the edits presents a conflict, and making changes to resolve the conflicts when conflicts are presented; and saving the edits and changes.

In at least another embodiment, this invention provides a system for collaborative content creation on a voicesite, the system including a telephonic call management system in communication with multiple telephone lines, wherein the telephonic call management system is capable simultaneously receiving multiple inputs; a browser component in communication with the telephonic call management system; a voice-driven generator of voice based applications in communication with the browser; and a database in communication with the browser, wherein the database is capable of storing information related to multiple users.

In at least another embodiment, this invention provides a system for collaborative content creation including means for allowing multiple users to access a voicesite at the same or different times; means for allowing multiple users to create and edit a voicesite via the telephone at the same or different times; means for determining whether any of the edits presents a conflict, and means for making changes to resolve the conflicts when conflicts are presented; and means for saving the edits and changes.

Given the following enabling description of the drawings, the apparatus should become evident to a person of ordinary skill in the art.

IV. BRIEF DESCRIPTION OF THE DRAWINGS

The present invention is described with reference to the accompanying drawings, wherein.

Given the following enabling description of the drawings, the invention should become evident to a person of ordinary skill in the art.

V. DETAILED DESCRIPTION OF THE DRAWINGS

The present invention in at least one embodiment provides a system and method that enables users to collaboratively create and edit the content on VoiceSites using mobile or landline telephones. The system and method allows one or multiple users, i.e., authors and/or roles, to access, create, and edit a VoiceSite at the same or different times. It automatically merges any changes/updates made to the VoiceSite while maintaining the synchronization of the changes/updates. In at least one embodiment, the system and method utilizes a collaborative manager that manages outbound calls to and inbound calls from one or more users of the system. Voice activated prompts are utilized to allow the one or more users to efficiently create and/or edit the VoiceSite.

Figure 1A:
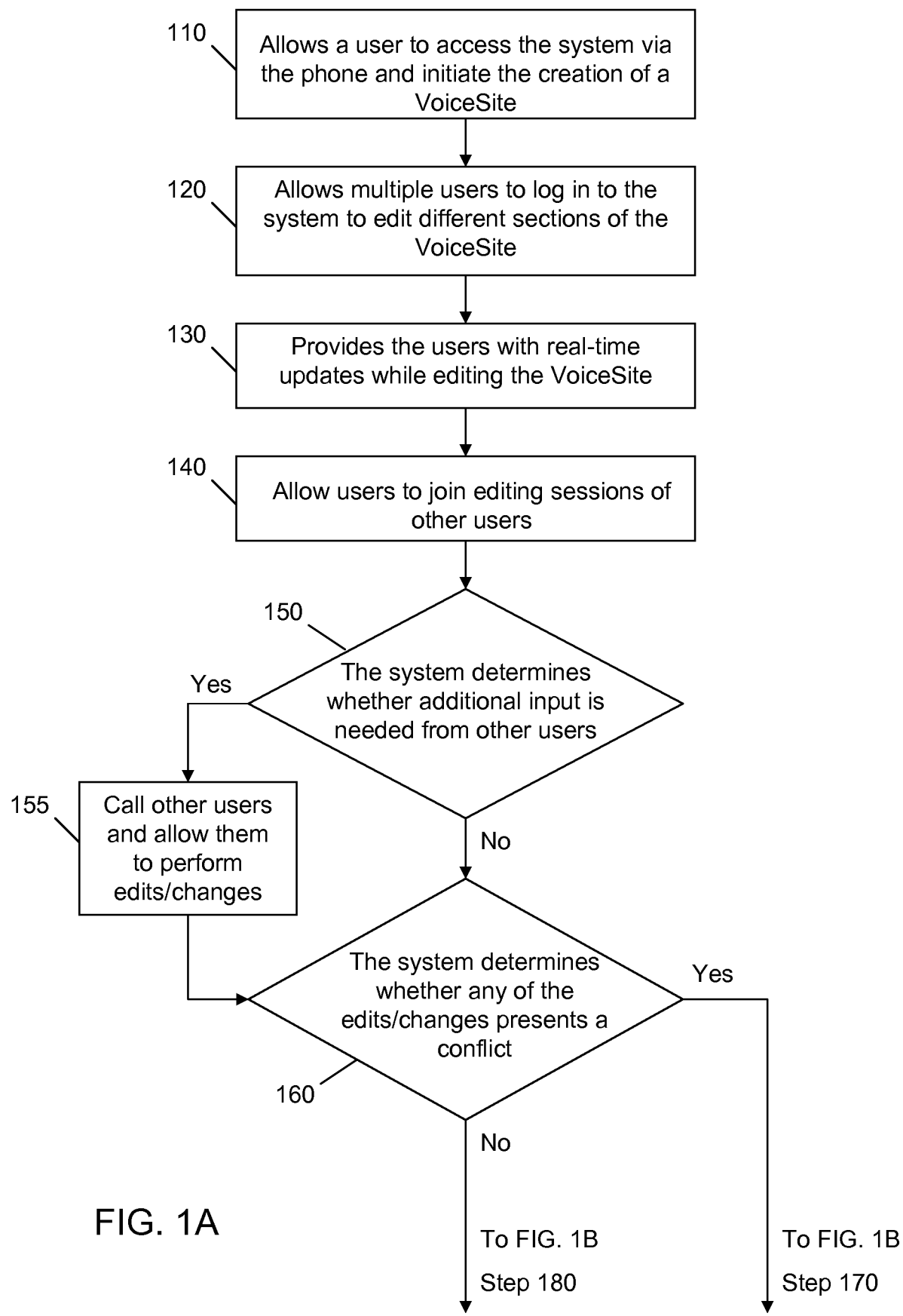
FIG. 1A illustrates a method for collaborative content creation on the Spoken Web in accordance with an embodiment of the present invention.
Figure 1B:
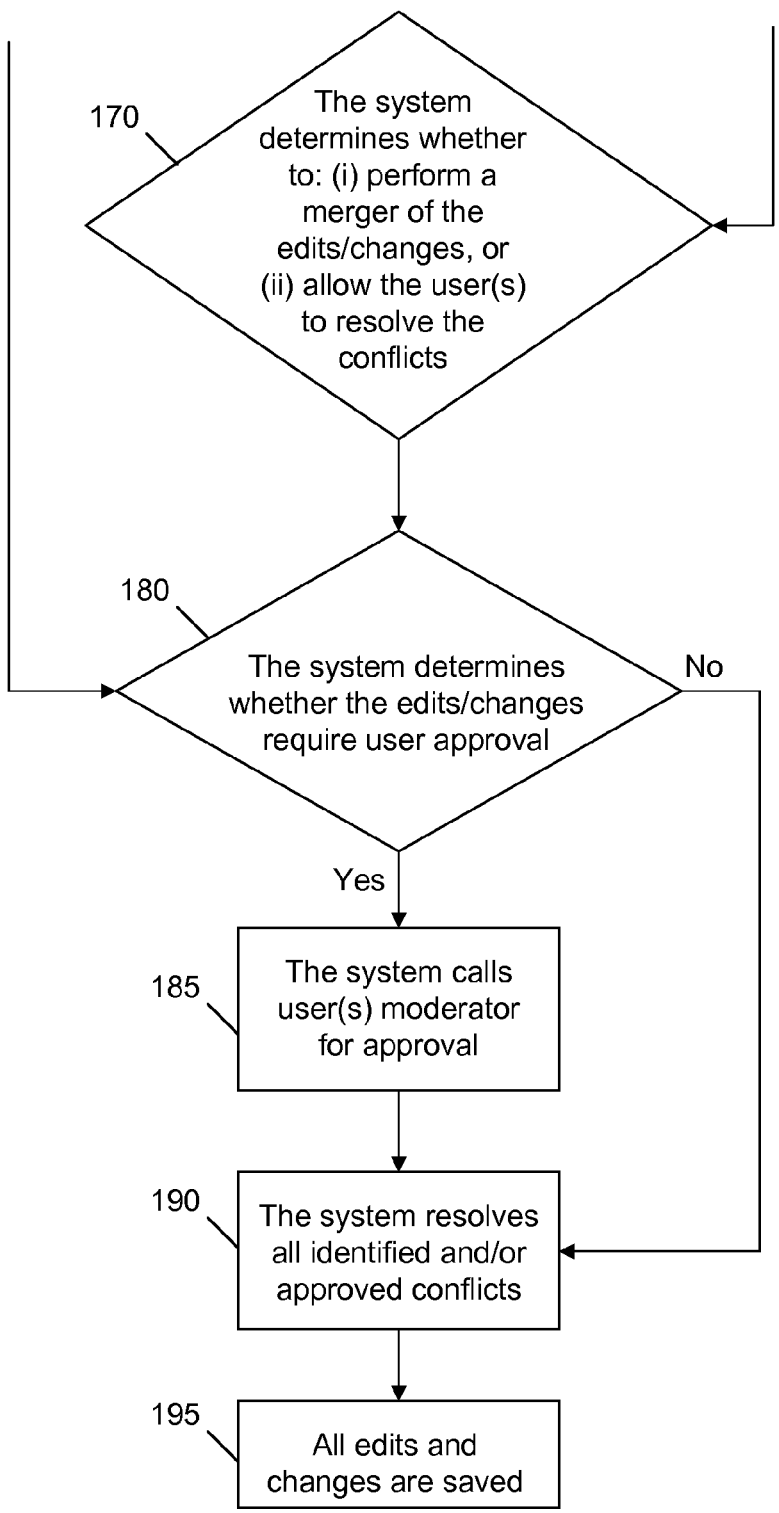
FIG. 1B illustrates a method for collaborative content creation on the Spoken Web in accordance with an embodiment of the present invention.

The present invention provides users with multiple ways to collaboratively edit the content on a VoiceSite. In at least one embodiment, as illustrated in FIGS. 1A-1B, the present invention provides a method for collaborative content creation on the Spoken Web, as follows. Beginning with FIG.

1A, at 110, one or multiple user(s) (author(s)) access the system by dialing in over the telephone. At 120, the system allows the one or multiple users to log in at the same or different times to edit different sections of the content and structure of the VoiceSite. At 130, as users are editing the content and structure of the VoiceSite the system provides the users with real time updates and alerts related to modifications of the content and structure of the VoiceSite performed by other users. At 140, the system allows users to join the "editing sessions" of other users such that the users can edit the content together. The "editing sessions" can be used for people recording a 'conversation' (such as Radio Disc Jockeys), to guide a novice user, to resolve and edit conflicts, etc.). At 150, the system determines whether additional input is needed from other users who are currently offline. If "Yes", the system proceeds to 155, calls the user(s) and allows the user(s) to join the session including provide their input, i.e., make their own edits and changes to the content and structure of the VoiceSite. If "No", the system proceeds to 160. At 160, the system determines whether any of the edits or changes to the VoiceSite presents a conflict. If "No", the system proceeds to 180 of FIG. 1B. If "Yes", the system proceeds to 170 of FIG. 1B and determines whether: (i) to perform a merger of the edits/changes, or (ii) to allow the user(s) to resolve the conflicts related to the edits/changes. User resolution of conflicts may be performed immediately or at a later time, e.g., upon the next user login. At 180, the system determines whether any of the edits/changes to the VoiceSite require approval or moderation. If "Yes", the system proceeds to 185 and performs an approval procedure. The approval procedure may be completed by calling an identified party, e.g., an authorized user, moderator or administrator, or by scheduling a future call to obtain the needed approval. Multiple people can moderate/approve the content at the same/different time(s). If "No", the system proceeds to 190. At 190, the system performs a merger of the identified and/or approved edits/changes. At 195, the system saves all edits and changes.

In at least one embodiment, entire VoiceSites can be created just by calling different users (sequentially or simultaneously) as and when their input is needed for the VoiceSite. Users, if busy, can set reminder call-backs to give their inputs at a later time or when they login next.

Figure 2:
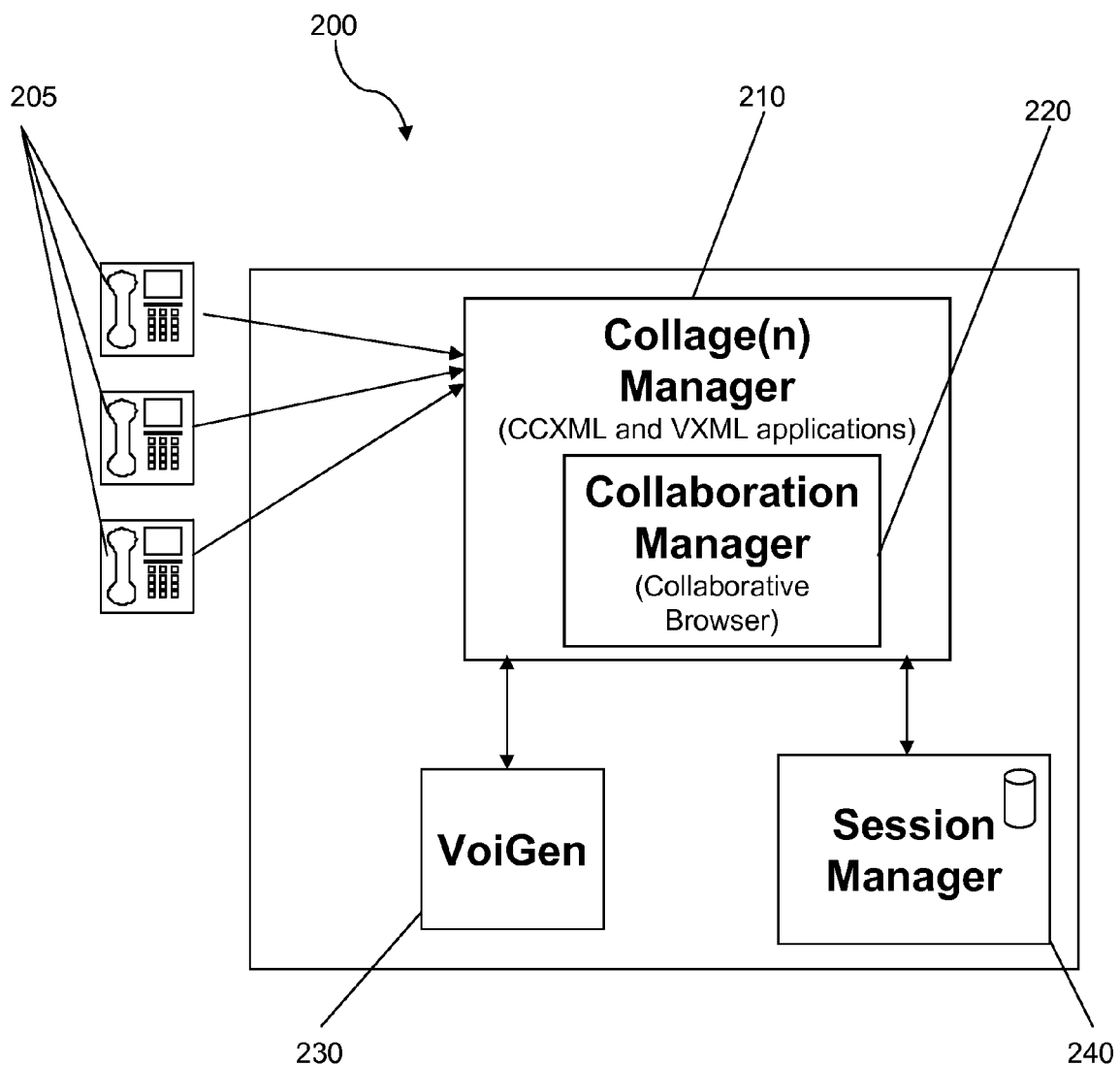
FIG. 2 illustrates a system for collaborative content creation on the Spoken Web in accordance with an embodiment of the present invention.

In at least one embodiment, as illustrated in FIG. 2, the present invention provides a system for collaborative content creation on the Spoken Web. The system 200 includes several components, including Collage(n) Manager 210, Collaboration Manager 220, VoiGen 230, and Session Manager 240. The components of system 200 enable the system to manage outbound calls to and inbound telephone calls from multiple users involved in creating and/or editing the VoiceSite. Collage(n) Manager 210 is supported by CCXML and VXML applications. The CCXML or Call Control eXtensible Markup Language application provides telephony call control support for dialog systems, such as VXML, that complement and integrate a VXML interpreter. The VXML or Voice eXtensible Markup Language helps create audio dialogs that include functions such as synthesized speech, digitized audio, recognition of spoken and Dual-tone Multi-Frequency Signaling (DTMF) key input, recording of spoken input, telephony, and mixed initiative conversations. The CCXML and VXML applications allow the system to utilize the advantages of Web-based development and content delivery via interactive voice response applications. Users may access the system 200 by dialing into the Collage(n) Manager 210 utilizing one or more telephones 205, such as landline, cellular, smart phones, and the like. The Collage(n) Manager 210 allows users to collaboratively edit sections of the VoiceSite, send real time alerts or join existing editing sessions. The Collaboration Manager 220 along with the Collage(n) Manager 210 help manage calls and sessions with multiple users for editing the VoiceSite, and communicate with VoiGen 230 and Session Manager 240, accordingly. The Collaboration Manager 220 initiates outbound calls to users for requesting input for the VoiceSite. VoiGen 230 is a voice-driven generator of voice based applications. VoiGen 230 simplifies the process of creating voice based applications by enabling telephone users to create applications, e.g., voicesites, tele-blogging, and personal call handling, by dialing into the system. VoiGen 230 allows users to compose applications and make edits and changes by navigating through a set of customizable voice-prompted options. Session Manager 240 stores the session information for all users. Session Manager 240 is a component that is capable of storing and managing session information for multiple users including all edits and changes while the users simultaneously edit different VoiceSites or VoiceSite sections. Collage(n) Manager can help set reminders for people or configure call back options for users who may provide input at a later time.

The Collage(n) Manager 210 and Collaboration Manager 220 of system 200 enable multiple users to simultaneously utilize VoiGen 230. Inbound calls from one or more users who wish to edit the VoiceSite are received by Collage(n) Manager 210. The CCXML and VXML applications of Collage(n) Manager 210 allows system 200 to use voice prompts to train/guide users through the VoiceSite creation process. The Collage(n) Manager 210 utilizes "whisper sessions" and speaker recognition to distinguish users in order to ensure that consistent and accurate input is received for each user. When multiple users access the system 200 using different telephones 205, the Collagen Manager 210 establishes separate "call legs" to allow "whisper sessions" for each user. The "whisper sessions" allows the Collagen Manager 210 to recognize and distinguish the content provided by each user. When multiple users access the system 200 using the same telephone 205, the Collagen Manager 210 utilizes speaker recognition to in order to distinguish the content provided by each user. Also, when users are calling from different telephone lines the Collaboration Manager 210 is capable of muting users such that only one or more particular user(s) may offer input. Further, the system 200 stores a user profile for each user in the Session Manager 240. The system 200 may assign tasks to users while creating VoiceSite(s) based on the previous VoiceSite creation experience of the user which is stored in the user profile.

The invention can take the form of an entirely hardware embodiment, an entirely software embodiment or an embodiment containing both hardware and software elements. In at least one exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be understood that each block of the flowchart illustrations and block diagrams and combinations of those blocks can be implemented by computer program instructions and/or means. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. The accompanying drawings illustrate exemplary embodiments of the invention.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

We claim:

1. A method for collaborative content creation comprising:
   allowing multiple users to access a voicesite at the same or different times;
   allowing multiple users to create and edit sections of a voicesite at the same or different times, wherein said users access the voicesite using one or more telephones;
   determining whether any of the edits presents a conflict, and making changes to resolve said conflicts when conflicts are presented; and
   saving said edits and changes.

2. The method according to claim 1, wherein said users edit the content and structure of the voicesite using said one or more telephones.

3. The method according to claim 1, further comprising providing said users with real time updates while other users are editing said voicesite.

4. The method according to claim 1, further comprising allowing said users to join editing sessions of other users for collaborative editing.

5. The method according to claim 1, determining whether additional edits and changes are needed from other users, and
   when additional edits and changes are needed, calling other users and allowing said users to perform edits and changes or waiting until the user logs in the next time.

6. The method according to claim 5, further comprising determining whether any of the edits and changes presents a conflict.

7. The method according to claim 6, further comprising:
   when conflicts are presented, determining whether to perform a merger of said edits and changes, or allow said users to resolve the conflicts.

8. The method according to claim 6, further comprising:
   when no conflicts are presented, determining whether said edits and changes require user approval.

9. The method according to claim 8, further comprising:
   when no approval is required, resolving all identified conflicts.

10. The method according to claim 8, further comprising:
    when approval is required, requesting approval for said edits and changes by either calling the user or by waiting until the user logs in next.

11. The method according to claim 10, wherein multiple users can moderate and validate the content at the same or different times.

12. The method according to claim 10, further comprising resolving all approved conflicts.

13. The method according to claim 12, further comprising saving all edits and changes.

14. The method according to claim 1, further comprising utilizing voice-prompts to train users to build different voicesites.

15. The method according to claim 1, further comprising automatically distinguishing and storing each user's input in a corresponding voicesite and section, including users that are calling from the same phone or different phones.

16. The method according to claim 1, further comprising assigning voicesite creation tasks to users based on previous voicesite creation experiences.

* * * * *